US011659072B2

(12) United States Patent
Gorshe et al.

(10) Patent No.: US 11,659,072 B2
(45) Date of Patent: May 23, 2023

(54) APPARATUS FOR ADAPTING A CONSTANT BIT RATE CLIENT SIGNAL INTO THE PATH LAYER OF A TELECOM SIGNAL

(71) Applicant: Microsemi Storage Solutions, Inc., Chandler, AZ (US)

(72) Inventors: Steven Scott Gorshe, Beaverton, OR (US); Winston Mok, Vancouver (CA)

(73) Assignee: Microsemi Storage Solutions, Inc., Chandler, AZ (US)

( * ) Notice: Subject to any disclaimer, the term of this patent is extended or adjusted under 35 U.S.C. 154(b) by 112 days.

(21) Appl. No.: 17/406,966

(22) Filed: Aug. 19, 2021

(65) Prior Publication Data

US 2021/0385310 A1    Dec. 9, 2021

Related U.S. Application Data

(62) Division of application No. 16/374,631, filed on Apr. 3, 2019, now Pat. No. 11,128,742.

(Continued)

(51) Int. Cl.
*H04L 69/324* (2022.01)
*H04L 49/90* (2022.01)

(52) U.S. Cl.
CPC ............ *H04L 69/324* (2013.01); *H04L 49/90* (2013.01)

(58) Field of Classification Search
CPC ..... H04L 69/324; H04L 49/90; H04L 49/351; H04L 1/0072; H04L 1/0057; H04J 3/07; H04J 3/1658
See application file for complete search history.

(56) References Cited

U.S. PATENT DOCUMENTS 5,343,482 A    8/1994    Penner et al.
5,361,277 A    11/1994   Grover
(Continued)

FOREIGN PATENT DOCUMENTS

DE         50216803 T2    11/2007
DE     102017222442 A1    6/2019
(Continued)

OTHER PUBLICATIONS

"IEEE 802.3 IEEE Standard for Ethernet Clause 82", IEEE, 2012.
(Continued)

*Primary Examiner* — Pao Sinkantarakorn
*Assistant Examiner* — Kabir U Jahangir
(74) *Attorney, Agent, or Firm* — Glass and Associates; Kenneth Glass

(57) ABSTRACT

A source node for rate adapting a constant bit rate client signal into a signal stream in a 64B/66B-block telecom signal communication link includes a GMP engine; a FIFO buffer coupled to receive a 64B/66B encoded client data stream; a clock rate measuring circuit; a source of 64B/66B path overhead blocks; a source of 64B/66B pad blocks; a source of 64B/66B idle blocks; a multiplexer; and a multiplexer controller. A control 64B/66B block is encoded into an ordered set block-designator and a count of data blocks to be sent in a next path signal frame is encoded into a plurality of path overhead 64B/66B data blocks. The multiplexer controller is responsive to a count of data blocks to be sent in a next path signal frame from a previous GMP window frame to selectively pass data to a data output so as to fill a GMP window frame.

13 Claims, 6 Drawing Sheets

Related U.S. Application Data

(60) Provisional application No. 62/815,931, filed on Mar. 8, 2019.

(56) References Cited

U.S. PATENT DOCUMENTS

| | | | |
|---|---|---|---|
| 5,371,765 A | 12/1994 | Guilford | |
| 5,600,824 A | 2/1997 | Williams et al. | |
| 5,640,398 A | 6/1997 | Carr et al. | |
| 5,838,512 A | 11/1998 | Okazaki | |
| 5,850,422 A | 12/1998 | Chen | |
| 5,905,766 A | 5/1999 | Nguyen | |
| 6,044,122 A | 3/2000 | Ellersick et al. | |
| 6,052,073 A | 4/2000 | Carr et al. | |
| 6,138,061 A | 10/2000 | McEnnan et al. | |
| 6,150,965 A | 11/2000 | Carr et al. | |
| 6,188,699 B1 | 2/2001 | Lang et al. | |
| 6,333,935 B1 | 12/2001 | Carr et al. | |
| 6,345,052 B1 | 2/2002 | Tse et al. | |
| 6,359,479 B1 | 3/2002 | Oprescu | |
| 6,584,521 B1 | 6/2003 | Dillabough et al. | |
| 6,603,776 B1 | 8/2003 | Fedders et al. | |
| 6,668,297 B1 | 12/2003 | Karr et al. | |
| 6,671,758 B1 | 12/2003 | Cam et al. | |
| 6,744,787 B1 | 6/2004 | Schatz et al. | |
| 6,820,159 B2 | 11/2004 | Mok et al. | |
| 6,823,001 B1 | 11/2004 | Chea | |
| 6,829,717 B1 | 12/2004 | Roust | |
| 6,870,831 B2 | 3/2005 | Hughes et al. | |
| 7,117,112 B2 | 10/2006 | Mok | |
| 7,161,999 B2 | 1/2007 | Parikh | |
| 7,165,003 B2 | 1/2007 | Mok | |
| 7,187,741 B2 | 3/2007 | Pontius et al. | |
| 7,203,616 B2 | 4/2007 | Mok | |
| 7,239,650 B2 | 7/2007 | Rakib et al. | |
| 7,239,669 B2 | 7/2007 | Cummings et al. | |
| 7,295,945 B2 | 11/2007 | Mok | |
| 7,388,160 B2 | 6/2008 | Mok et al. | |
| 7,417,985 B1 | 8/2008 | McCrosky et al. | |
| 7,468,974 B1 | 12/2008 | Carr et al. | |
| 7,492,760 B1 | 2/2009 | Plante et al. | |
| 7,593,411 B2 | 9/2009 | McCrosky et al. | |
| 7,656,791 B1 | 2/2010 | Mok et al. | |
| 7,668,210 B1 | 2/2010 | Mok et al. | |
| 7,751,411 B2 | 7/2010 | Cam et al. | |
| 7,772,898 B2 | 8/2010 | Cheung | |
| 7,807,933 B2 | 10/2010 | Mok et al. | |
| 7,817,673 B2 | 10/2010 | Scott et al. | |
| 8,010,355 B2 | 8/2011 | Rahbar | |
| 8,023,641 B2 | 9/2011 | Rahbar | |
| 8,085,764 B1 | 12/2011 | McCrosky et al. | |
| 8,243,759 B2 | 8/2012 | Rahbar | |
| 8,335,319 B2 | 12/2012 | Rahbar | |
| 8,413,006 B1 | 4/2013 | Mok et al. | |
| 8,428,203 B1 | 4/2013 | Zortea et al. | |
| 8,483,244 B2 | 7/2013 | Rahbar | |
| 8,542,708 B1 | 9/2013 | Mok et al. | |
| 8,599,986 B2 | 12/2013 | Rahbar | |
| 8,774,227 B2 | 7/2014 | Rahbar | |
| 8,854,963 B1 | 10/2014 | Muma et al. | |
| 8,913,688 B1 | 12/2014 | Jenkins | |
| 8,957,711 B2 | 2/2015 | Jin et al. | |
| 8,971,548 B2 | 3/2015 | Rahbar et al. | |
| 8,976,816 B1 | 3/2015 | Mok et al. | |
| 8,989,222 B1 | 3/2015 | Mok et al. | |
| 9,019,997 B1 | 4/2015 | Mok et al. | |
| 9,025,594 B1 | 5/2015 | Mok et al. | |
| 9,209,965 B2 | 12/2015 | Rahbar et al. | |
| 9,276,874 B1 | 3/2016 | Mok et al. | |
| 9,313,563 B1 | 4/2016 | Mok et al. | |
| 9,337,960 B2 | 5/2016 | Zhong | |
| 9,374,265 B1 | 6/2016 | Mok et al. | |
| 9,444,474 B2 | 9/2016 | Rahbar et al. | |
| 9,473,261 B1 | 10/2016 | Tse et al. | |
| 9,503,254 B2 | 11/2016 | Rahbar et al. | |
| 9,525,482 B1 | 12/2016 | Tse | |
| 10,069,503 B2 | 9/2018 | Zhang et al. | |
| 10,079,651 B2 | 9/2018 | Ramachandra | |
| 10,104,047 B2 | 10/2018 | Muma et al. | |
| 10,128,826 B2 | 11/2018 | Jin et al. | |
| 10,218,823 B2 | 2/2019 | Gareau | |
| 10,250,379 B2 | 4/2019 | Haddad et al. | |
| 10,397,088 B2 | 8/2019 | Gareau | |
| 10,432,553 B2 | 10/2019 | Tse | |
| 10,594,423 B1 | 3/2020 | Anand et al. | |
| 10,608,647 B1 | 3/2020 | Ranganathan et al. | |
| 10,797,816 B1 | 10/2020 | Gorshe et al. | |
| 10,917,097 B1 | 2/2021 | Meyer et al. | |
| 11,108,895 B2 | 8/2021 | Mok et al. | |
| 11,128,742 B2 | 9/2021 | Gorshe et al. | |
| 11,239,933 B2 | 2/2022 | Mok et al. | |
| 2001/0056512 A1 | 12/2001 | Mok et al. | |
| 2002/0158700 A1 | 10/2002 | Nemoto | |
| 2004/0082982 A1 | 4/2004 | Gord et al. | |
| 2005/0110524 A1 | 5/2005 | Glasser | |
| 2006/0056560 A1 | 3/2006 | Aweya et al. | |
| 2006/0064716 A1 | 3/2006 | Sull et al. | |
| 2006/0076988 A1 | 4/2006 | Kessels et al. | |
| 2007/0036173 A1 | 2/2007 | McCrosky et al. | |
| 2007/0064834 A1 | 3/2007 | Yoshizawa | |
| 2007/0132259 A1 | 6/2007 | Ivannikov et al. | |
| 2008/0000176 A1 | 1/2008 | Mandelzys et al. | |
| 2008/0202805 A1 | 8/2008 | Mok et al. | |
| 2010/0052797 A1 | 3/2010 | Carley et al. | |
| 2011/0095830 A1 | 4/2011 | Tsangaropoulos et al. | |
| 2012/0158990 A1 | 6/2012 | Losio et al. | |
| 2014/0055179 A1 | 2/2014 | Gong et al. | |
| 2014/0139275 A1 | 5/2014 | Dally et al. | |
| 2014/0149821 A1 | 5/2014 | Zhou et al. | |
| 2015/0117177 A1 | 4/2015 | Ganga et al. | |
| 2016/0020872 A1 | 1/2016 | Zhong | |
| 2016/0277030 A1 | 9/2016 | Burbano et al. | |
| 2016/0301669 A1 | 10/2016 | Muma et al. | |
| 2016/0315634 A1 | 10/2016 | Mei et al. | |
| 2017/0005949 A1* | 1/2017 | Gareau | H04L 12/413 |
| 2017/0171163 A1 | 6/2017 | Gareau et al. | |
| 2017/0244648 A1 | 8/2017 | Tse | |
| 2018/0131378 A1 | 5/2018 | Haroun et al. | |
| 2018/0145928 A1 | 5/2018 | Zhong et al. | |
| 2018/0159541 A1 | 6/2018 | Spijker | |
| 2018/0159785 A1 | 6/2018 | Wu et al. | |
| 2018/0183708 A1 | 6/2018 | Farkas et al. | |
| 2019/0097758 A1 | 3/2019 | Huang et al. | |
| 2019/0394309 A1 | 12/2019 | Caldwell et al. | |
| 2020/0067827 A1 | 2/2020 | Mei et al. | |
| 2020/0244383 A1* | 7/2020 | He | H03M 9/00 |
| 2020/0287998 A1 | 9/2020 | Gorshe et al. | |
| 2020/0295874 A1 | 9/2020 | Cheng et al. | |
| 2020/0296486 A1 | 9/2020 | Kiang et al. | |
| 2020/0396097 A1 | 12/2020 | Deng et al. | |
| 2021/0385310 A1 | 12/2021 | Gorshe et al. | |
| 2022/0021472 A1* | 1/2022 | Stracca | H04L 25/4908 |

FOREIGN PATENT DOCUMENTS

| | | |
|---|---|---|
| EP | 1145477 A1 | 10/2001 |
| EP | 3544210 A1 | 9/2019 |
| JP | 3565600 B2 | 9/2004 |
| WO | 2003039061 A3 | 10/2003 |
| WO | 2020185247 A1 | 9/2020 |
| WO | 2021040762 A1 | 3/2021 |
| WO | 2021151187 A1 | 8/2021 |

OTHER PUBLICATIONS

"ITU-T Recommendation G.709 Interfaces for the Optical Transport Networks", ITU-T G.709/Y.1331, International Telecommunication Union, Jun. 2016.

"MEF 8 Implementation Agreement for the Emulation of PDH Circuits over Metro Ethernet Networks", Metro Ethernet Forum, Oct. 2004.

Maarten Vissers, "FlexE aware mapping method 6B text proposal;CD11-106", ITU-T Draft; Study Period 2013-2016, International Tele-

(56) References Cited

OTHER PUBLICATIONS communication Union, Geneva; CH, vol. 11/15, Jan. 12, 2016 (Jan. 12, 2016), pp. 1-3, Last paragraph of p. 2, p. 3, Figures 17-22.
Malcolm Johnson et al., "Optical Transport Networks from TDM to packet", ITU-T Manual 2010; ITU-T Draft; Study Period 2009-2012, International Telecommunication Union, Geneva, Switzerland, Feb. 22, 2011, pp. 91-122.
PCT/US2019/042915, International Search Report and Written Opinion, dated Feb. 25, 2020.
PCT/US2019/042915, Invitation to Pay Additional Fees and, Where Applicable, Protest Fee, International Searching Authority, dated Nov. 25, 2019.
Zhang Sen et al, "Hybrid Multiplexing over FlexE Group," 2018 23rd Opto-Electronics and Communications Conference (OECC), IEEE, Jul. 2, 2018, p. 1-2.
U.S. Appl. No. 16/563,399, filed Sep. 6, 2019, Qu Gary Jin.
BA34003 Datasheet (Integrated Device Technology, Inc) Jun. 17, 2019 (Jun. 17, 2019).
Abdo Ahmad et al: "Low-Power Circuit for Measuring and Compensating Phase Interpolator Non-Linearity", 2019 IEEE 10th Annual Information Technology, Electronics and Mobile Communication Conference (IEMCON), IEEE, Oct. 17, 2019 (Oct. 17, 2019), pp. 310-313.
Eyal Oren Broadcom Limited USA, "MTN Section Layer frame and Path layer format considerations;C1522", ITU-T Draft; Study Period 2017-2020; Study Group 15; Series C1522, International Telecommunication Union, Geneva ; CH, Geneva ; CH, (Jun. 18, 2019), vol. 11/15, pp. 1-4, XP044270354.
ITU-T Draft, "Interfaces for the metro transport network; g8312", Study period 2017-2020; Study Group 15; Series 8312, International Telecommunication Union, Geneva, Switzerland, Nov. 2020.
ITU-T G.8013/Y.1731, "Operation, administration and maintenance (OAM) functions and mechanisms for Ethernet-based networks", International Telecommunication Union, Geneva, Switzerland, Aug. 2015.

Qiwen Zhong, Huawei Technologies Co., Ltd. China, "Discussion and proposal for G.mtn terminologies regarding Ethernet client signal;WD11-39", ITU-T Draft; Study Period 2017-2020; Study Group 15; Series WD11-39, International Telecommunication Union, Geneva ; CH, Geneva ; CH, (Apr. 1, 2019), vol. 11/15, pp. 1-10, XP044264678.
Qiwen Zhong, Huawei Technologies Co., Ltd. P. R. China, "Analysis for IPG based G.mtn path layer OAM insertion impact on IEEE 802.3 PCS state machine;C1195", ITU-T Draft; Study Period 2017-2020; Study Group 15; Series C1195, International Telecommunication Union, Geneva ; CH, Geneva ; CH, (Jun. 18, 2019), vol. 11/15, pp. 1-6, XP044270155.
Steve Gorshe, Microsemi Corp. U.S.A., "Analysis of the G.mtn A.1 Scope Relative to IEEE 802.3 Clause 82 State Diagrams;C1179", ITU-T Draft; Study Period 2017-2020; Study Group 15; Series C1179, International Telecommunication Union, Geneva ; CH, Geneva ; CH, (Jun. 18, 2019), vol. 11/15, pp. 1-11, XP044270147.
Trowbridge, Steve, "G.mtn Section and Path Overhead Options," ITU-T WD11-10, International Telecommunication Union, Geneva, Switzerland, Apr. 2019.
Ximing Dong CICT P.R. China, "Feasibility Analysis: the Use of Idle as a Resources to Carry Path layer OAM; WD11-16", ITU-T Draft; Study Period 2017-2020; Study Group 15; Series WD11-16, International Telecommunication Union, Geneva ; CH, Geneva ; CH, (Apr. 1, 2019), vol. 11/15, pp. 1-6, XP044264659.
Yang, Jian, Betts, Malkcolm, Gu, Yuan, "SCL OAM solution", ITU-T WD11-65 Submission, International Telecommunication Union, Geneva, Switzerland, Jun. 2018.
"Interfaces for the metro transport network;g8312", ITU-T Draft; Study Period 2017-2020; Study Group 15; Series G8312, International Telecommunication Union, Geneva; CH vol. 11/15, Nov. 25, 2020 (Nov. 25, 2020), pp. 1-21, XP044302831, Retrieved from the Internet: URL:https://www.itu.int/ifa/t/2017/sg15/exchange/wp3/qll/G.8312/g8312-IcCommentResol utions-v3.docx [retrieved on Nov. 25, 2020].

* cited by examiner

APPARATUS FOR ADAPTING A CONSTANT BIT RATE CLIENT SIGNAL INTO THE PATH LAYER OF A TELECOM SIGNAL

The present invention relates to data transmission. More particularly, the present invention relates to support for constant bit rate (CBR) clients by mapping a CBR digital client signal of an arbitrary rate into the payload of a telecom network server layer channel.

BACKGROUND

A constant bit rate (CBR) signal (e.g., a digital video signal) delivers bits at known fixed rate. It has become common to group consecutive data bits into 64-bit blocks that are then encapsulated into a 66-bit line code block (64B/66B encoding). The resulting block-coded stream then has a fixed rate of "W" bit/s (with some variance based on the CBR signal clock source accuracy).

The newly-launched MTN project in ITU-T SG15 initially assumes all client signals are Ethernet and lacks a direct method to support constant bit rate (CBR) clients. There are two categories of previous solutions for transporting CBR clients along a path from a source node to a sink node. One category creates a CBR path signal containing the client and some additional path overhead. It then uses overhead in the server signal to accommodate the difference between the path signal rate and the server payload channel rate. While there are various approaches within this category, the ITU-T Generic Mapping Procedure (GMP) is a commonly used solution for mapping a CBR digital client signal of an arbitrary rate into the payload of a telecom network server layer channel. The source uses the GMP overhead in each GMP window to send a count value (Cm) that tells the sink node how many payload data blocks it will send in the next window. The source node uses a modulo arithmetic algorithm based on Cm for inserting pad blocks to fill any channel bandwidth not required by the client signal. The sink uses the same algorithm to recover the data. However, the server channel for the MTN project in ITU-T SG15 does not provide for GMP overhead. Since the GMP overhead is relatively small and regularly spaced, this approach typically greatly simplifies the sink receiver process for deriving the client signal rate when it extracts the signal. A disadvantage of this approach is that it requires server section overhead, which must be processed at each node along the path.

The other category of solution operates in the packet domain. Fixed-sized portions of the CBR client signal stream are periodically encapsulated into Layer 2 or Layer 3 packets (e.g., Ethernet frames) sent from source to sink as the path signal. The sink then extracts the client data from the packets to reconstruct the client signal. Differences in clock domains along the path are accommodated by inserting or removing inter-packet idle blocks. This approach is popular in networks that primarily carry packet information with relatively little CBR traffic.

One drawback of this solution is the large amount of overhead bandwidth required for the packet encapsulation. Another drawback is that packet processing along the path, including the standard Ethernet Idle insertion/removal process (IMP), creates jitter due to irregular inter-packet arrival times at the sink. This adds significant complexity to the process of deriving the client signal rate at the sink, since average packet arrival time can be modified by intervening equipment. Also, using packets adds latency at the source and sink nodes and requires much larger buffers at the sink node.

As defined by the ITU-T (G.709 Optical Transport Networks), GMP requires a consistent fixed number of bits per GMP window. The server channel is point-to-point between nodes such that the GMP is terminated at the ingress to an intermediate node and generated anew at the node's egress port. Since the server channel for the MTN lacks GMP overhead, it would be desirable to move the GMP function into "path" overhead (POH) that is added to the client signal stream. POH passes through intermediate nodes without modification. Hence, placing GMP in the POH allows using legacy intermediate nodes without upgrade, since it avoids the need to add GMP processing to them. The problem with using GMP in the POH is that an intermediate node has a different clock domain than the source node, which makes it impossible to maintain a constant fixed number of bits for each GMP window. GMP only adjusts the amount of payload information sent per window, but the time period for the window is set by the source node based on its reference clock (REFCLK).

BRIEF DESCRIPTION

The present invention overcomes the intermediate clock domain problem by adding a mechanism that allows a small variable spacing between GMP windows.

The present invention allows using GMP in the path overhead (POH) for adapting the path stream to the source's server channel such that it can pass through intermediate nodes and provide the sink node with the frequency (rate) information that it can use for recovering the client signal.

The client stream consists of Ethernet-compliant 64B/66B blocks. POH is inserted into that stream as a special ordered set (OS) and identifiable 64B/66B data blocks to create the path signal stream. Unlike G.709, which relies on a framing pattern and fixed spacing for finding the GMP OH, the invention uses a 64B/66B OS block to identify the boundary of the GMP window, with the other POH/GMP blocks located in fixed locations within the GMP window.

The present invention uses the fact that the GMP Cm is, by definition, the count of the number of 64B/66B data (i.e., non-stuff) blocks that the source node will transmit in the next GMP window. Consequently, the sink node can accommodate having the GMP window extended by an arbitrary number of blocks since the Cm allows the Sink to determine when the Source has finished sending all the data (i.e., non-pad data) for that window. This insight allows using the approach of adding a small block of 64B/66B Idle blocks to each GMP window such that an intermediate node can increase or decrease the number of Idle blocks in order to do rate adaptation according to the standard Ethernet Idle insertion/removal process (IMP). The required Idle block length inserted by the Source will be a function of the chosen frame length such that the maximum 200 ppm clock difference between the nodes can be accommodated.

The sink node recovers the client signal rate through the combination of the received GMP overhead and average number of idles it receives. GMP further helps the receiver PLL by its smoother distribution of stuff/pad blocks.

The present invention uses existing nodes, which perform this padding adjustment by adding or removing Ethernet Idle blocks (i.e., the standard IMP process).

The sink node that extracts the CBR client signal must determine the CBR signal rate in order to re-create the output signal at exactly the correct rate. In accordance with the present invention, the sink node uses a combination of the rate it recovers/observes from the section signal coming into that node, the amount of IMP padding between the section and path signal, and the amount of GMP padding between the client and path signal to re-create the output signal at exactly the correct rate.

According to an aspect of the invention, a method for rate adapting a constant bit rate client signal into a signal stream in a 64B/66B-block telecom signal communication link including at a source node encoding into a control 64B/66B block an ordered set block-designator, at the source node encoding into a plurality of path overhead 64B/66B data blocks a count of data blocks to be encoded in a signal 64B/66B block, at the source node encoding into each of a plurality of signal 64B/66B blocks a total number of data blocks from the constant bit rate client signal equal to the count sent in the path overhead 64B/66B data blocks and a number of 64B/66B pad blocks, assembling the plurality of path overhead 64B/66B data blocks, the plurality of signal 64B/66B blocks and the control 64B/66B block into a path signal frame, the control 64B/66B block occupying a last position in the path signal frame, appending a set of number of 64B/66B idle blocks including a number of 64B/66B idle blocks at a position past the control 64B/66B block following the end of the path signal frame to match a link bit rate of a first link segment, and transmitting the path signal frame and the appended number of 64B/66B idle blocks from the source node into the signal stream at the first link segment at the link bit rate.

According to an aspect of the invention, the count of data blocks to be encoded in a path overhead 64B/66B block is variable, and the appended number of idle blocks is fixed.

According to an aspect of the invention, the count of data blocks to be encoded in a path overhead 64B/66B block is fixed, and the appended number of idle blocks is variable.

According to an aspect of the invention, the method includes receiving the path signal frame with the appended number of idle character 64B/66B blocks from the first link segment at an intermediate node, adapting the link bit rate to a bit rate internal to the intermediate node by conditionally appending additional idle character 64B/66B blocks to the set of idle character 64B/66B blocks when the link bit rate is slower than a bit rate in the intermediate node and by conditionally deleting idle character 64B/66B blocks from the set of idle character 64B/66B blocks when the link rate is faster than the bit rate in the intermediate node to form a modified set of idle character 64B/66B blocks, and transmitting the path signal frame and the modified set of idle character 64B/66B blocks into the signal stream at a second link segment from the intermediate node at the link bit rate.

According to an aspect of the invention, the method includes receiving the path signal frame and the modified set of idle character 64B/66B blocks at the link bit rate from the second link segment at a sink node, extracting in the sink node the count of encoded data blocks from the plurality of path overhead 64B/66B data blocks, extracting in the sink node the encoded data blocks from the modified signal 64B/66B block, regenerating from the extracted encoded data blocks the constant bit rate client signal, and determining in the sink node a bit rate of the constant bit rate client signal from a sink node reference clock and both the extracted count of encoded data blocks, and the number of idle character 64B/66B blocks in the modified set of idle character 64B/66B blocks and adjusting the rate of a constant bit rate client signal clock for transmitting the constant bit rate client signal at the bit rate of the constant bit rate client signal.

BRIEF DESCRIPTION OF THE DRAWING FIGURES

The invention will be explained in more detail in the following with reference to embodiments and to the drawing in which are shown:

DETAILED DESCRIPTION

Persons of ordinary skill in the art will realize that the following description is illustrative only and not in any way limiting. Other embodiments will readily suggest themselves to such skilled persons.

Figure 1:
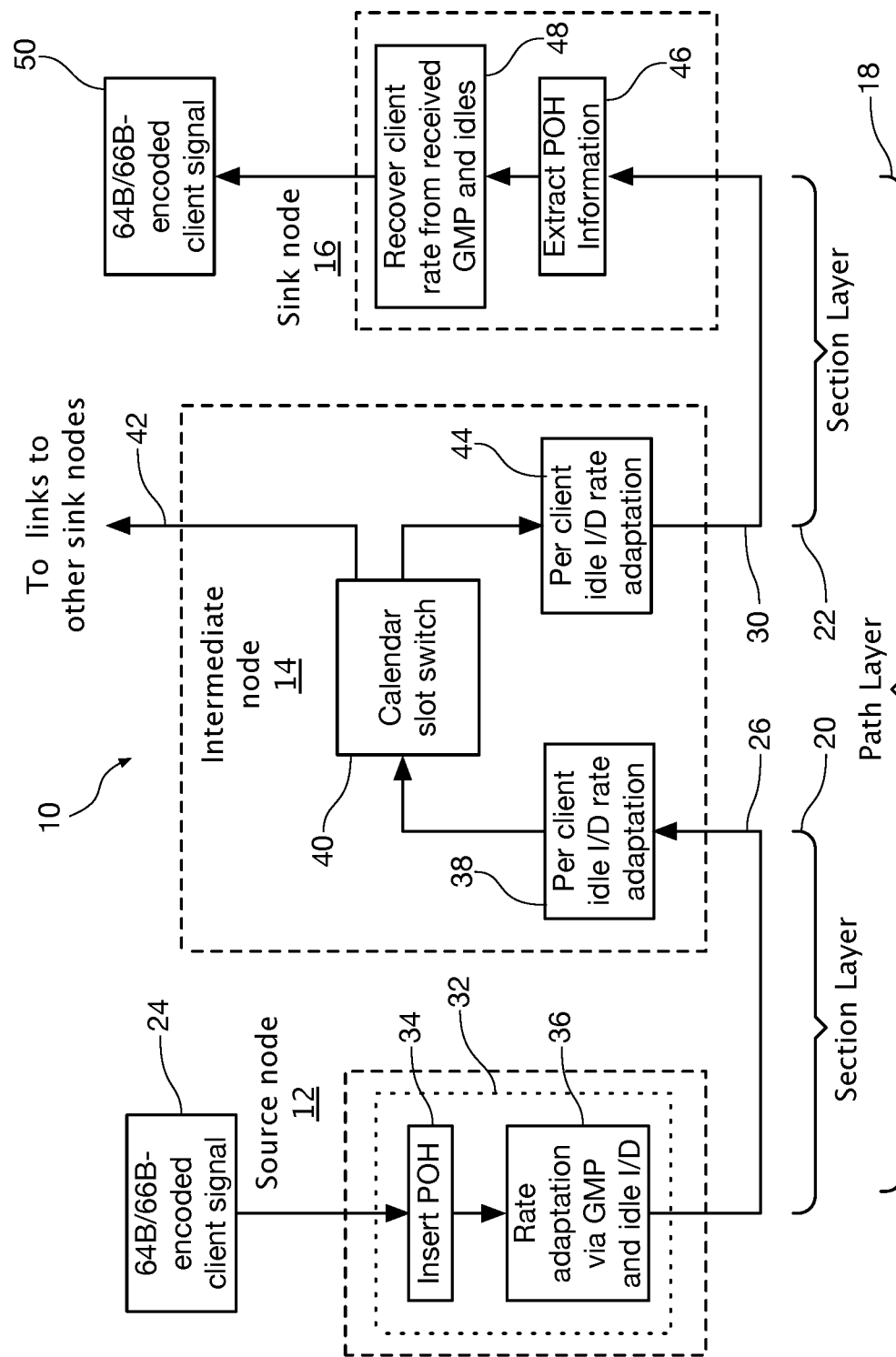
FIG. 1 is a diagram showing a basic network illustration using GMP in the POH for adapting a Path stream to a source server channel.

Referring first to FIG. 1 a diagram illustrates a typical data flow in a network 10 in accordance with the present invention from a source node 12, through an intermediate node 14, and ultimately to a sink or destination node 16.

There are two nested channels used to carry a CBR signal through the network. The first channel extends end-to-end, i.e., from where the CBR signal enters the network in the source node 12 and through the one or more intermediate nodes 14 to where it exits the network in the sink or destination node 16. This channel is referred to as the "path" layer channel herein and is indicated in brackets at reference numeral 18 in FIG. 1.

The CBR signal plus overhead information inserted by the present invention is carried hop-by-hop over a network composed of multiple pieces of switching equipment (nodes), with nodes connected to each other by some physical media channel. This physical media channel (the second of the two cascaded channels) is referred to as the "section" layer channel herein. A first section layer channel connects the source node 12 to the intermediate node 14 and is indicated in brackets at reference numeral 20 in FIG. 1. A second section layer channel connects the intermediate node 14 to the sink or destination node 16 and is indicated in brackets at reference numeral 22 in FIG. 1.

A set of 64B/66B-encoded CBR client signals 24 are delivered to the source node 12, which after adding the appropriate performance monitoring overheads, inserts the set of 64B/66B-encoded CBR client signals 24 into a link 26 towards the intermediate node 14. The section layer 20 encompasses all of the information carried over the link 26. For purposes of this disclosure, it is assumed that the incoming client signals 24 have been adapted into 64B/66B format in such a way that all the 64B/66B blocks are data blocks.

The intermediate node 14 is typically connected to multiple source nodes 12 and multiple sink nodes 14. Client signals are switched by the intermediate node 14 onto a set of egress links (one of which is identified by reference numeral 30), connected to multiple sink nodes. The particular sink node 16 shown in FIG. 1 is designated as the destination sink node for the 64B/66B-encoded CBR client signals 24 and extracts the performance monitoring overheads and recovers the 64B/66B-encoded CBR client signals 24.

Managing this traffic from multiple source nodes to multiple sink nodes is typically handled using the FlexE calendar slot technique known in the art. This layer of the data transport is not shown in FIG. 1 in order to avoid overcomplicating the disclosure and obscuring the invention. Persons of ordinary skill in the art will appreciate that the clock timing concepts for data transmission disclosed herein reflect the calendar slot timing employed in the FlexE technique, which will be referred to as is necessary for an understanding of the invention.

The section layer is based on FlexE, in which the time-division multiplexed channels are referred to as calendar slots. The term comes from the fact that each calendar slot appears multiple times per FlexE frame on a fixed interval between appearances of the same calendar slot.

The section layers 20 and 22 are carried by the link 26 between the source node 12 and the intermediate node 14 and the link 30 between the intermediate node 14 and the sink node 16, respectively. Persons of ordinary skill in the art will appreciate that performance monitor overhead unrelated to the present invention (not shown) for link 26 is inserted before the data leaves the source node 12 and is monitored in the intermediate node 14. Similarly, performance monitor overhead unrelated to the present invention (not shown) for link 30 is inserted before the data leaves the intermediate node 14 and is monitored in the sink node 16. The section layer 20, or 22, originates at the transmit end of a link 26, or 30, and is terminated at the receive end either in the intermediate node (link 26) or the sink node (link 30), respectively.

Each 64B/66B-encoded CBR client signal 24 is also associated with a path layer 18 running from the source node 12 to the sink node 16. The path layer 18 spans from the source node 12 the sink node 16. The intermediate node 14 treats the CBR client signal 24 and the associated path layer 18 overhead information as a single unit. They are switched from a link 26, also known as ingress link 26 to link 30, also known as egress link 30, together, indivisibly.

At the ingress of the source node 12, the client data received in the 64B/66B-encoded CBR client signal 24 is prepared for forwarding to the intermediate node 14 within the dashed line designated by reference numeral 32. The insert POH at reference numeral 34 inserts path level performance monitor overhead information for the client signal 24. The path level performance monitor overhead includes several components, including for the purposes of the present invention the number Cm which is an identification of the number of blocks of client data that will be transmitted in the next frame. In reference numeral 36, rate adaptation is inserted via GMP and the number of idle blocks inserted is identified. Idle blocks are inserted to adapt the client signal 24 to the payload capacity of the calendar slots of the FlexE multiplexing protocol and to the clock rate of the link 26 connecting the source node 12 to the intermediate node 14. The clock rate of the link 26 is known by the source node 12 which transmits into the link 26. The client signal 24 as augmented by the POH and inserted idle blocks is transmitted by the source node 12 to the intermediate node 14 through the link 26.

Figure 4A:
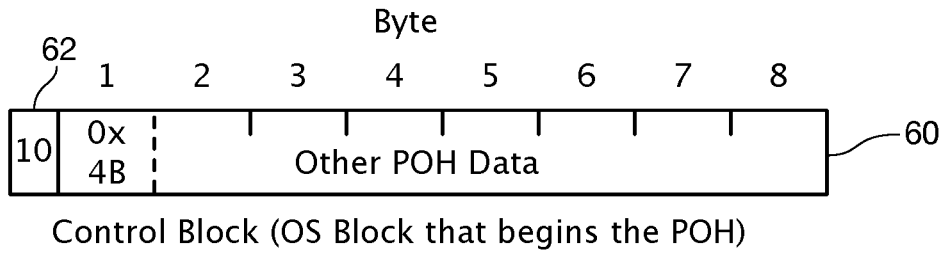
FIGS. 4A, 4B and 4C are diagrams that shows the structure of a 64B/66B block.
Figure 4B:
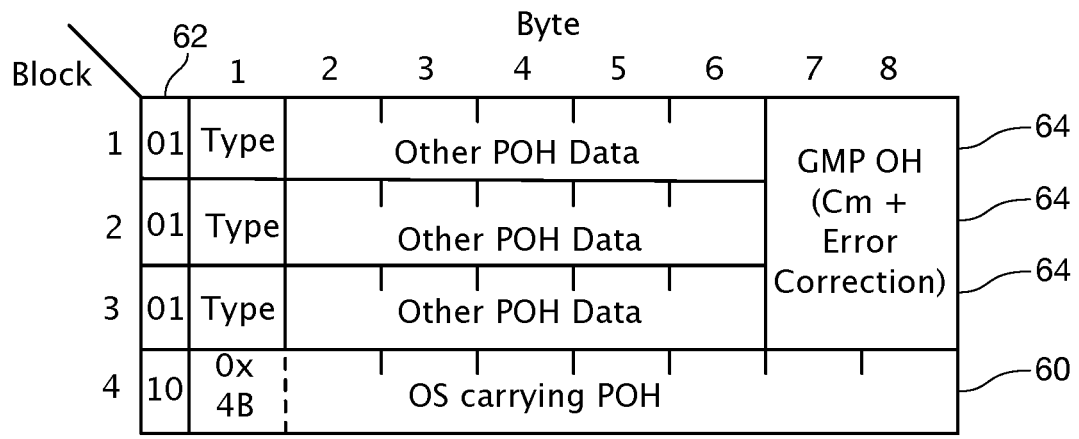
Figure 4C:
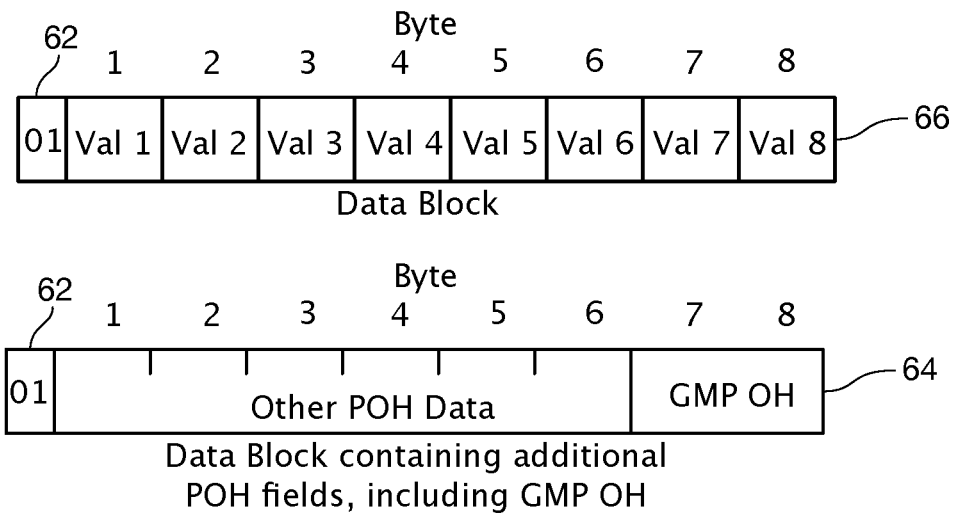

As will be shown with reference to FIGS. 4A, 4B, and 4C, a control block header, and an ordered set block-designator are encoded into a control 64B/66B block at the source node 12 as part of insert POH block 34. A data block header and a count of data blocks to be encoded in a signal 64B/66B block are encoded into a plurality of path overhead 64B/66B data blocks. A data block header, a total number of data blocks from the CBR client signal 24 equal to the count sent in the path overhead 64B/66B data blocks and a number of 64b/66B pad blocks are encoded into each of a plurality of signal 64B/66B blocks. The data blocks and path overhead blocks are preferably distributed rather than lumped together for greater immunity to error bursts because they are used later to help reconstruct the client signal clock for the client CBR signal at the sink node.

The plurality of path overhead data 64B/66B blocks, the plurality of signal 64B/66B blocks and the control 64B/66B block are assembled into a path signal frame. The control 64B/66B block occupies a last position in the path signal frame. A set of idle character 64B/66B blocks having a number of idle character 64B/66B blocks selected to produce an assembly that matches a link bit rate of a first link segment are appended at a position past the control 64B/66B block following the end of the path signal frame. The path signal frame and the appended number of idle character 64B/66B blocks are transmitted from the source node into the signal stream at the first link segment 26 at the respective link bit rate.

In the intermediate node 14 the encoded client signals sent by the source node 12 are adapted to the clock rate of the intermediate node 14 in reference numeral 38, which inserts or deletes idle character 64B/66B blocks from the data stream as necessary to match the data stream rate to the clock rate of the intermediate node 14. The path signal frame with the appended number of idle character 64B/66B blocks is received from the first link segment 26 at the intermediate node 14, the link bit rate is adapted to a bit rate internal to the intermediate node 14 by appending additional idle character 64B/66B blocks to the set of idle character 64B/66B blocks when the link bit rate is slower than a bit rate in the intermediate node and by deleting idle character 64B/66B blocks from the set of idle character 64B/66B blocks when the link rate is faster than the bit rate in the intermediate node to form a modified set of idle character 64B/66B blocks. After distribution by calendar slot switch 40, to be discussed further below, the modified set of idle character 64B/66B blocks is further modified in reference numeral 44 to adapt the clock rate of the intermediate node 14 to the rate of link 30, and the path signal frame and the further modified set of idle character 64B/66B blocks is transmitted into the signal stream at a second link segment 30 from the intermediate node 14 at the respective link bit rate. In particular the link bit rate is adapted from the bit rate internal of intermediate node 14 to the link bit rate of link 30 by appending additional idle character 64B/66B blocks to the set of idle character 64B/66B blocks when the bit rate in the intermediate node 14 is slower than the bit rate of link 30 and by deleting idle character 64B/66B blocks from the set of idle character 64B/66B blocks when the bit rate in the intermediate node 14 is faster than the bit rate of link 30 to form the further modified set of idle character 64B/66B blocks The intermediate node 14 includes a calendar slot switch 40 for distributing the client data in calendar time slots according to the intended sink node in accordance with the FlexE scheme as known in the art. Link 42 is shown sending data to another sink node (not shown).

Figure 5A:
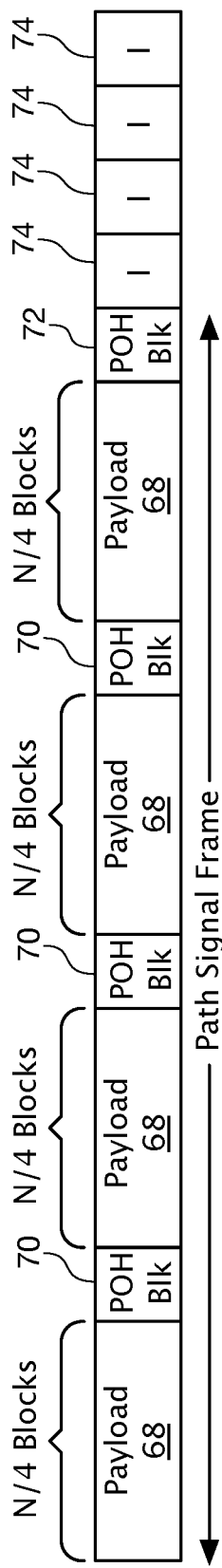
FIG. 5A is a diagram showing a representative path signal frame having client data disposed within the frame in a first manner.
Figure 5B:
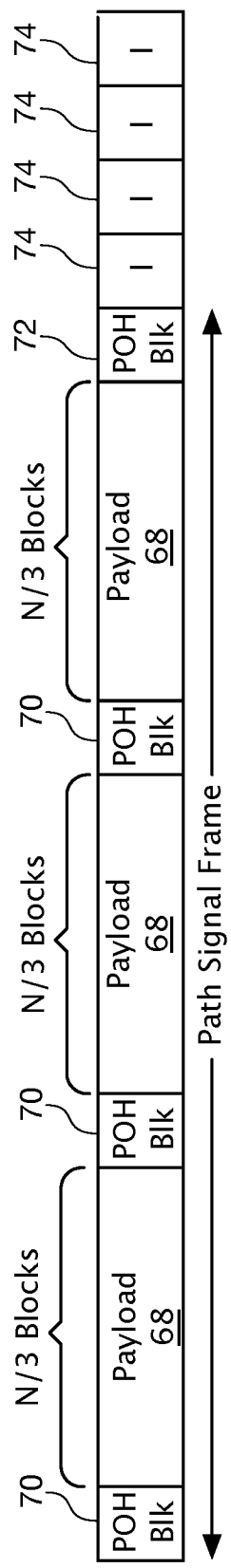
FIG. 5B is a diagram showing a representative path signal frame having client data disposed within the frame in a second manner.
Figure 5C:
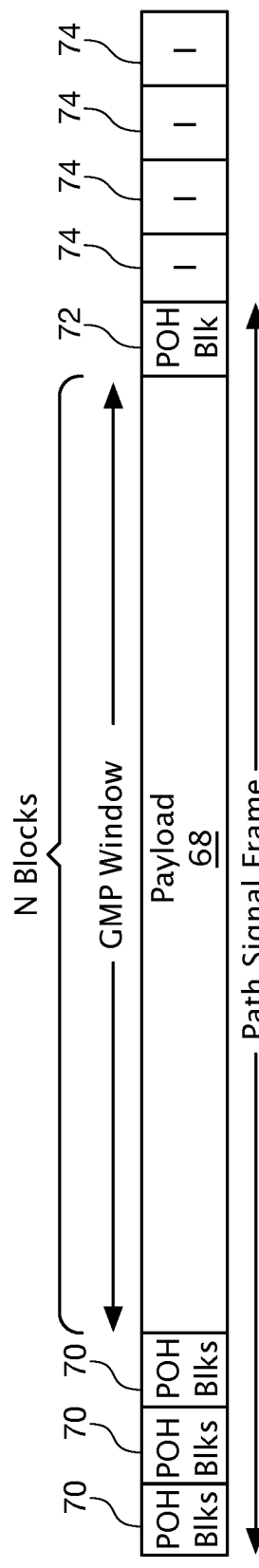
FIG. 5C is a diagram showing a representative path signal frame having client data disposed within the frame in a third manner.

The calendar slot switch 40 is a switch fabric that connects a path layer signal being carried over a set of calendar slots on an input port to a set of calendar slots on an output port. It is conceptually similar to any fabric for switching/cross-connecting constant rate signals. The main difference from other fabrics is that calendar slot switch 40 must use the I/D rate adapters 38 and 44 for rate adaptation. The I/D rate adapters 38 and 44 insert or remove idle blocks from between path signal frames as shown in FIGS. 5A, 5B, and 5C so that its resulting data rate matches the actual calendar slot rate of the switch fabric in the calendar slot switch 40 and then of the link 30 at the output port of intermediate node 14.

The path signal frame and the further modified set of idle character 64B/66B blocks is received at the respective link bit rate from the second link segment 30 at the sink node 16. In the sink node 16 the count of encoded data blocks is extracted from the plurality of path overhead 64B/66B data blocks. The encoded data blocks are extracted from the further modified signal 64B/66B block. The constant bit rate client signal is regenerated from the extracted encoded data blocks. A bit rate of the constant bit rate client signal is determined from the recovered bit rate of the incoming link 30, the extracted count (Cm) of encoded data blocks, and the number of idle character 64B/66B blocks in the further modified set of idle character 64B/66B blocks and adjusting the rate of a constant bit rate client signal clock for transmitting the constant bit rate client signal at the bit rate of the constant bit rate client signal 24 that was provided to source node 12.

In reference numeral 46 in the sink node 16 the path level performance monitor overhead information for the CBR client signal 24 is extracted from the client data signal. Included in that information is the number Cm that identifies how many data blocks are to be recovered from the next frame. The number Cm of data blocks to be recovered from the current frame has already been extracted from the previous frame by reference numeral 46.

At reference numeral 48, the GMP overhead (Cm) is recovered, the number of received idle blocks is counted, and the GMP pad blocks and all idle blocks are discarded. The output of block 48 is the resulting client 64B/66B CBR encoded signal as shown at reference numeral 50.

As can be appreciated by persons of ordinary skill in the art, the intermediate node 14 passes the client 64B/66B encoded signal through and only removes or adds idle blocks as necessary to adapt the rate of the incoming signal to its own clock rate and the clock rate of the link 30 between it and the sink node 16. The intermediate node 14 does not need to consume processing power to unpack and repackage the client 64B/66B encoded signal.

Figure 2:
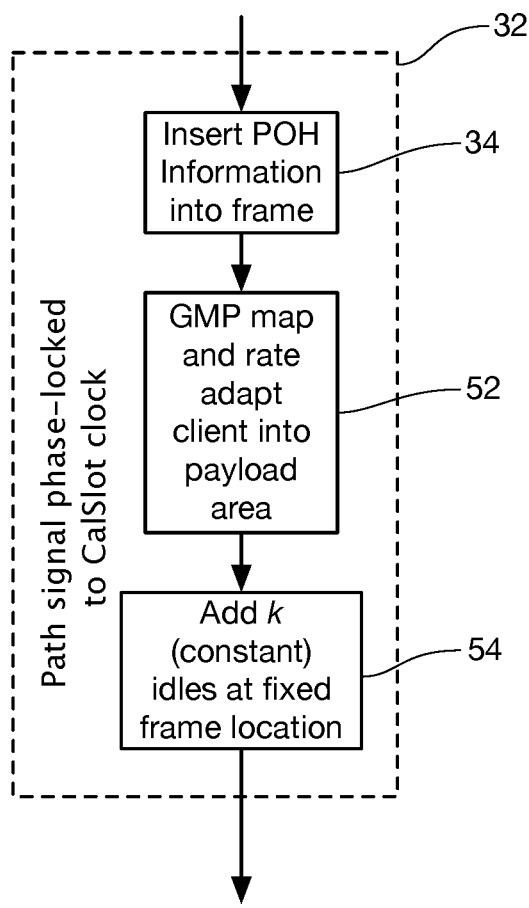
FIG. 2 is a diagram illustrating a first way for the source node to derive the path signal rate in accordance with an aspect of the present invention.

The POH insertion and rate adaptation performed at reference numerals 34 and 36 adapt the rate of the path overhead augmented 64B/66B-encoded client signal to the payload capacity of the FlexE calendar slots associated with the selected path layer (not shown) and to the clock rate of the link 26. In accordance with a first aspect of the invention as illustrated in FIG. 2, which shows a first embodiment of a more detailed reference number 32, the number Cm of data blocks is variable and a variable number of 64B/66B pad blocks are added to the frame at reference numeral 52 to achieve a nominal rate stream that has a bit rate that is a fixed amount lower than the payload capacity of the FlexE calendar slots for the selected path. The rest of the payload capacity is filled at reference numeral 54 by inserting a fixed number of 64B/66B idle blocks following the frame. In other words, the source node 12 inserts a variable number of 64B/66B pad blocks into the client data within the frame such that when the fixed/constant number of idle blocks is added at the end of the frame, the length in time of the resulting signal exactly matches the rate of the FlexE calendar slots that will carry it. In accordance with this aspect of the invention, the source node 12 derives the clock rate of the path layer signal 18 from the FlexE channel ("CalSlot") rate, and uses dynamic GMP for client mapping and source rate adaptation. The source node 12 transmits a constant minimum number of idle blocks per frame. No IMP is performed at the source node 12. The source node 12 GMP includes word fraction information to help the receiver phase locked loop (PLL). The sink node 16 determines the original client signal rate by examining the combination of the dynamic GMP information and the average number of idles it receives relative to the known number of idles inserted by the source node. The difference between the known number of idles inserted by the source node and the average number of received idles is that the one or more intermediate nodes has modified the number of idles.

Figure 3:
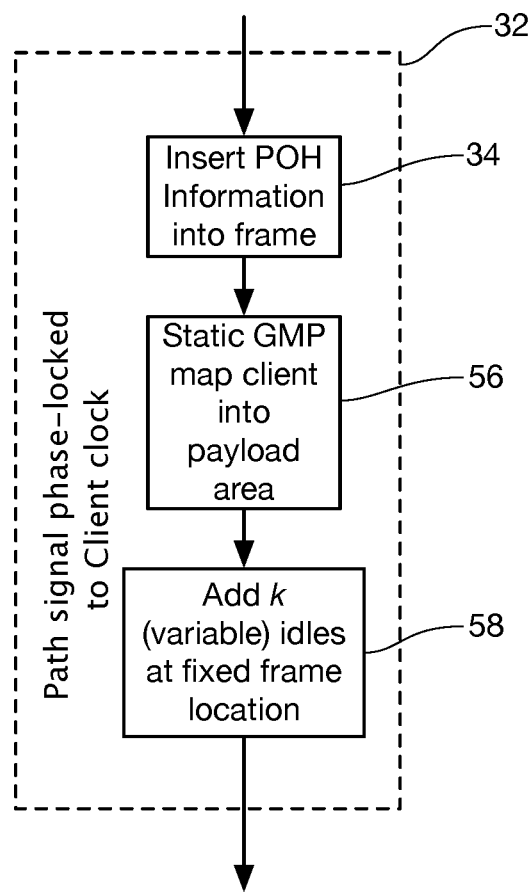
FIG. 3 is a diagram illustrating a second way for the source node to derive the path signal rate in accordance with an aspect of the present invention.

According to another aspect of the invention as shown with reference to FIG. 3, which shows a second embodiment of a more detailed reference number 32, a variable number of 64B/66B pad blocks are inserted to construct a stuff augmented stream with a bit rate that varies with that of the 64B/66B encoded client signal 24. As in the embodiment of FIG. 2, the POH insertion is performed at reference numeral 34. A fixed number of 64B/66B Data blocks (Cm) and 64B/66B pad blocks are added to the frame at reference numeral 56 to achieve a stream that has a bit rate that is a variable amount lower than the payload capacity of the FlexE calendar slots for the selected path 18. The rest of the payload capacity is filled by inserting a variable number of 64B/66B idle blocks in each frame as shown at reference numeral 58 to fill the assigned Calendar Slots into FlexE type Cal Slots. In accordance with this aspect of the invention, the source node 12 derives the path signal rate from the client rate, uses static GMP for mapping, and uses IMP for source rate adaptation. The predetermined constant GMP Cm is used in order to create a path signal that is slightly slower than the nominal server channel rate. The standard FlexE "Shim" layer then uses IMP to add idle blocks between frames in order to fill any remaining bandwidth in the link 26. The sink node 16 will determine the original client rate based only on the average number of received 64B/66B idle blocks. In this embodiment GMP is primarily used to provide a smooth delivery of payload blocks within the path frame payload at a fixed rate per path frame.

While the standard link protocol provides that the bit rate of the section links 26 or 30 is nominally the same between each pair of connected nodes, differences in clock source accuracy at each node cause small frequency variations in rate for each node-to-node link. Consequently, each node needs to make some adjustment to the number of 64B/66B idle blocks so that it adds the appropriate number of 64B/

66B idle blocks between the path signal frames to match the section layer channel rate of the next hop.

The per client idle I/D rate adapt block 38 of intermediate node 14 inserts or deletes idle blocks on a per-client basis. The bitrate of the ingress stream over link 26 is adjusted to match the clock in the intermediate node 14 controlling the payload capacity of the calendar slots in the FlexE scheme set by the calendar slot switch block 40. The calendar slot switch block 40 switches client signals delivered by one set of calendar slots through ingress link 26 to the corresponding FlexE calendar slots of a destination set of egress links 30. Typically, the capacity of calendar slots in the switch 40 matches that of the egress link 30. In that case, the rate adaptation block 44 may be omitted. In the case where the calendar slot rates of the calendar slot switch 40 and the egress link 30 are not the same, the rate adaptation block 44 inserts or deletes idle blocks in the client stream to match the rate of the resulting stream to that of the payload capacity of the calendar slots at the egress link 30.

The end-to-end path layer 18 carrying the CBR client is sent by the source node 12 with a bit rate of "X" bit/sec. The bit rate of a section layer channel 20 or 22 that carries the above path layer channel between nodes is "Z" bit/sec, where the rate of Z is somewhat higher than that of X. The present invention adds identifiable padding blocks to the path stream to accommodate the difference between the X and Z rates. According to one aspect of the invention, special Ethernet control blocks (Ethernet Idle or Ordered set blocks) are used for the padding blocks. According to a second aspect of the invention, the identifiable padding blocks are GMP pad blocks.

FIGS. 4A, 4B and 4C are diagrams that shows the structure of a 64B/66B block. FIG. 4A shows a control block 60. The block contains 64 information bits that are preceded by a 2-bit header identified at reference numeral 62, sometimes called the "sync header." If the 64B/66B block includes control information, the header is a control block header and is set to 10 as shown in FIG. 4A, and the 8-bit field at byte 1 following the header identifies the control block type. The block identified by reference numeral 60 is a control block. For the purpose of the present invention, the only control block type of interest is the ordered set block, designated by block type 0x4B. An ordered set (OS) 64B/66B block is shown in FIG. 4A.

FIG. 4B shows the organization of the 64B/66B control block 60 and three associated 64B/66B POH data blocks identified at reference numerals 64. Byte positions 7 and 8 in the three POH data blocks 64 are used to transport the data count Cm along with error correction data for the number Cm. The Cm data and the error correction data are distributed across the three 64B/66B POH data blocks 64 so that in the event of a single disruptive event during data transmission the number Cm can still be recovered using the error correction data.

Referring now to FIG. 4C, if the 64B/66B block only contains data (i.e., it is a data character), then the header is a data block header and is set to the value 01 and the 64 bits following the header contain 8 bytes of data (e.g., bytes from an Ethernet packet). The upper 64B/66B data block shown in FIG. 4C at reference numeral 66 contains only client data represented by Val 1 through Val 8 in byte positions 1 through 8. Data blocks can also contain additional POH fields including GMP overhead as shown in the lower 64B/66B POH block of FIG. 4C as shown at reference numeral 62 (also represented as 64B/66B blocks 64 in FIG. 4B).

FIGS. 5A, 5B and 5C show three different illustrative non-limiting arrangements for frames. FIGS. 5A and 5B are arrangements where N data blocks (identified as "Payload" at reference numerals 68) are distributed into segments. FIG. 5A shows the N data blocks being divided into four segments each including N/4 data blocks. Each data block segment is followed by a 64B/66B POH block 70. The 64B/66B POH block 72 at the end of the frame is the 64B/66B control block. FIG. 5B shows the N data blocks being divided into three segments each including N/3 data blocks. Each data block segment is preceded by a 64B/66B POH block. The 64B/66B POH block at the end of the frame is the control block.

FIG. 5C shows an arrangement where N data blocks (identified as "Payload 68") are grouped together, preceded by a group of three 64B/66B POH blocks. The 64B/66B POH block at the end of the frame is always the control block.

The frames in each of FIGS. 5A, 5B, and 5C are followed by a number of 64B/66B idle blocks (identified at reference numerals 74) that, as previously explained are used to rate adapt the frames to slight variations in the bit rates of the source node 12, the intermediate node 14, the sink node 16 and the links 26, 30 that connect them.

The control POH block 72 is positioned at the end of each of the frames depicted in FIGS. 5A, 5B, and 5C. This is done because intermediate nodes in telcom systems are already configured to insert idle blocks in data streams. The intermediate nodes are configured to always insert any necessary idle blocks 74 immediately following a control block. If the control blocks 72 of the present invention 72 were located in any of the other POH block positions, there is a risk that an intermediate node could insert an idle block 74 at a position immediately following the control block. This would completely disrupt the ability of the sink node to correctly find the path signal frame.

Figure 6A:
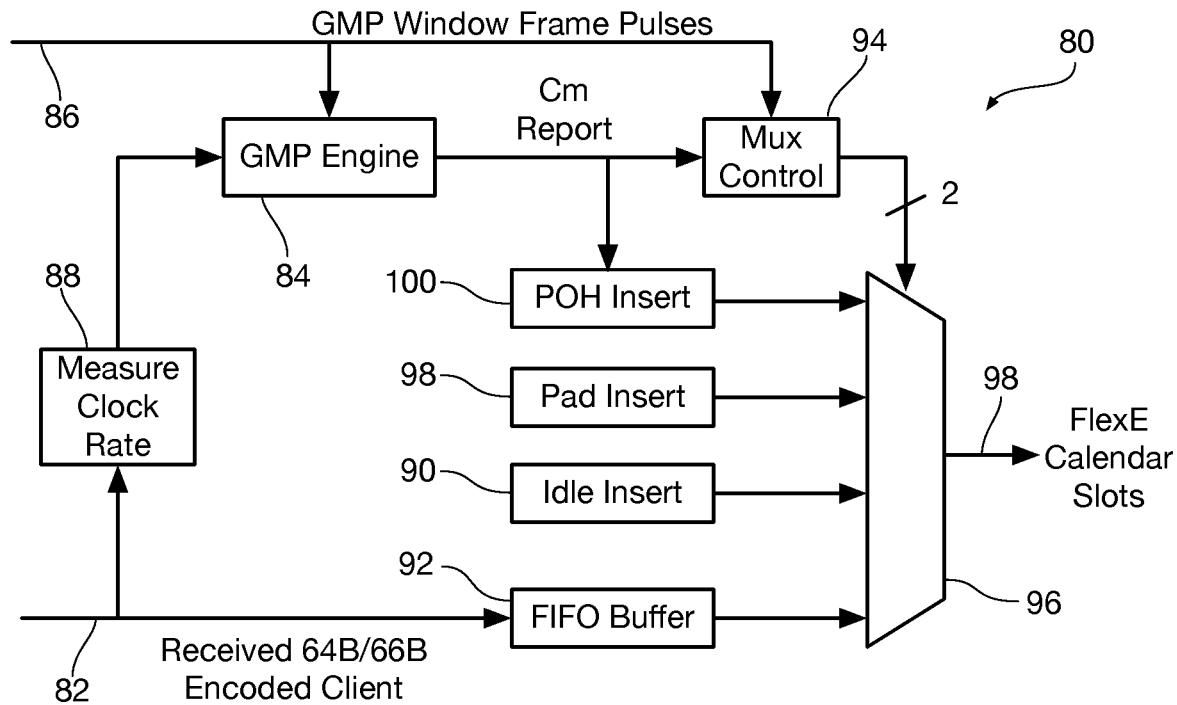
FIG. 6A is a block diagram of an example of a source node configured in accordance with an aspect of the present invention.

Referring now to FIG. 6A, a block diagram shows an example of a source node 80 configured in accordance with an aspect of the present invention. The source node 80 implements the aspect of the invention shown in FIG. 2. In FIG. 2, the number of GMP pad blocks is varied to fill a GMP frame having a fixed period. If the 64B/66B client encoded signal is slow more pad blocks are added. If the client is fast, fewer pad blocks are added. An external frame pulse on line 86 generated by a reference clock inside the source node is applied to assure that the GMP frame has a fixed period. Since the GMP frame has a fixed period and a fixed number of blocks per frame, and the FlexE calendar slot has a fixed capacity per time unit, the difference between them can be filled with a fixed number of 64B/66B idle blocks.

The 64B/66B client data is received on line 82. The path layer frame boundary is generated by GMP engine 84 that is time aligned by an external GMP window frame pulse on line 86. The GMP window frame pulse is generated by a master timing clock (not shown) for the node 80.

The GMP engine 84 determines the location of the POH blocks, and GMP pad blocks. The sum of payload data blocks and pad blocks per frame in a GMP frame is fixed. The number of payload data blocks and pad blocks per frame is fixed. The mix of payload data blocks and pad blocks per frame is variable, computed from the client data rate measured by the clock rate measuring circuit 88. A fixed number of 64B/66B idle blocks are inserted from the idle insert block 90 per GMP frame period, irrespective of the fill level of 64B/66B encoded client data blocks in FIFO buffer 92. The multiplexer controller 94 is controlled by the GMP engine 84 to direct the multiplexer 96 to select among payload data (64B/66B client data) from the FIFO buffer 92, 64B/66B idle blocks from idle insert block 90, 64B/66B pad blocks from pad insert block 98, and 64B/66B POH blocks from POH insert block 100. The output of the multiplexer 96 is presented to the FlexE calendar slots on line 98.

In both the embodiments shown in FIG. 2 and FIG. 3, the pad blocks are distributed amongst the data blocks rather than being concentrated at one location.

Figure 6B:
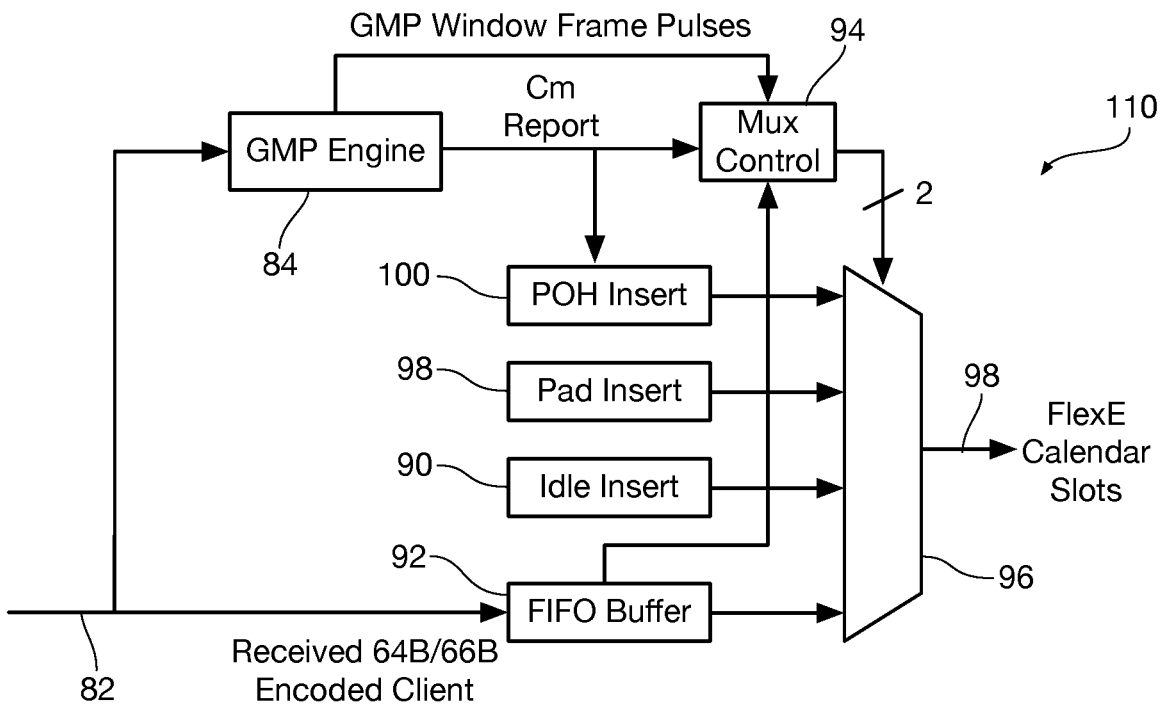
FIG. 6B is a block diagram of another example of a source node configured in accordance with an aspect of the present invention.

Referring now to FIG. 6B, a block diagram shows another example of a source node configured in accordance with an aspect of the present invention. Referring now to FIG. 6B, a block diagram shows an example of a source node 110 configured in accordance with an aspect of the present invention. Certain elements of the source node 110 are common to source node 80 of FIG. 6A and will be designated in FIG. 6B using the same reference numerals used in FIG. 6A for these elements.

The source node 110 implements the aspect of the invention shown in FIG. 3. The 64B/66B client data is received on line 82. The path layer frame boundary is generated by a free-running GMP engine 84 with no external time alignment. The GMP engine 84 determines the location of the 64B/66B POH blocks, and GMP pad blocks. The number of payload data blocks and 64B/66B pad blocks per frame is fixed. The higher the client rate, the shorter time it will take to accumulate the payload 64B/66B client data blocks within a GMP frame. The lower the client rate, the longer it will take to accumulate the payload data 64B/66B client data blocks within a GMP frame. Thus, the period of the GMP frame is determined by the bit rate of the incoming 64B/66B client data blocks on line 82. The multiplexer control 94 monitors the fill level of the FIFO buffer 92 that is accepting 64B/66B client data blocks over line 82. When the level of the FIFO buffer 92 is low, extra 64B/66B idle blocks are inserted. When the level of 64B/66B client data blocks in the FIFO buffer 92 is high, a reduced number of 64B/66B idle blocks are inserted. 64B/66B idle blocks are inserted between path layer frames. The multiplexer 96 is controlled by the GMP engine 84 to select among payload Data (64B/66B client data blocks) from the FIFO buffer 92, 64B/66B idle blocks from idle insert block 90, 64B/66B pad blocks from pad insert block 98, and 64B/66B POH blocks from POH insert block 96.

Figure 7:
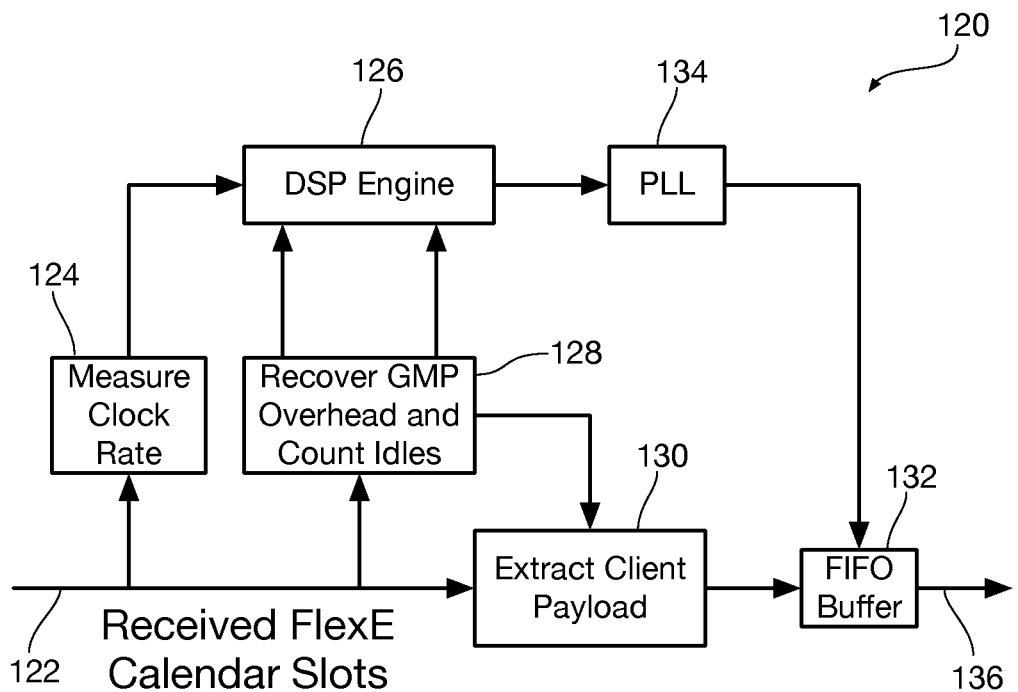
FIG. 7 is a block diagram of an example of a sink node configured in accordance with an aspect of the present invention.

Referring now to FIG. 7, a block diagram shows an example of a sink node 120 configured in accordance with an aspect of the present invention to receive streams generated by the source nodes shown in FIGS. 1 through 3. Incoming FlexE calendar slots carrying the client payload stream are received on line 122. The clock rate measuring circuit 124 measures the bitrate of the incoming FlexE calendar slots carrying the client payload stream. This rate is scaled by the DSP engine 126 to recover the client payload rate, as a function of the number of idles and the value of Cm in the GMP overhead as detected in the recover GMP overhead and count idle circuit 128. Using the Cm value and idle blocks identified by the recover GMP overhead and count idle circuit 128, the extract client payload block 130 identifies the payload, idle, and pad blocks within the GMP frame. The 64B/66B pad blocks and idle blocks are discarded while client payload 64B/66B data blocks are written into the FIFO buffer 132. The phase locked loop (PLL) 134 is controlled to read from FIFO buffer 132 on line 136 at the client payload rate. All other blocks in the FlexE calendar slots are discarded.

Persons of ordinary skill in the art will appreciate that the intermediate node 14 of FIG. 2 is configured in a conventional manner. As is clear from the disclosure herein, the intermediate node only inserts or deletes 64B/66B idle blocks as is known in the art to synchronize the data flow timing between its input and output rates without regard to the contents of the 64B/66B data and 64B/66B POH blocks.

The invention provides several advantages over prior-art solutions. The rate adaptation of the CBR client signal into the section layer is located within the path layer signal rather than the section layer overhead. This results in no impact on section layer format. In addition, using IMP allows using GMP for improved performance while making the path signal transparent to intermediate nodes, and hence having no impact on them. Unlike previous solutions, the present invention allows using GMP wholly-contained within the path signal. This provides the advantages of GMP relative to IMP/packet solutions including minimizing the required sink FIFO buffer, and simplifying the sink recovery of the client clock. The present invention maximizes server channel bandwidth available for the client signal, especially relative to packet-based solutions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A source node for rate adapting a constant bit rate client signal into a signal stream in a 64B/66B-block telecom signal communication link, the source node comprising:
    a ITU-T Generic Mapping Procedure (GMP) engine synchronized to an external source of GMP window frame pulses;
    a FIFO buffer coupled to receive a 64B/66B encoded client data stream;
    a clock rate measuring circuit coupled to measure a clock rate of the 64B/66B encoded client data stream and provide the clock rate to the GMP engine;
    a source of 64B/66B path overhead blocks, the path overhead 64B/66B blocks including a control 64B/66B block encoded into an ordered set block-designator and a plurality of path overhead 64B/66B data blocks, a count of data blocks to be sent in a next path signal frame encoded into the plurality of path overhead 64B/66B data blocks;
    a source of 64B/66B pad blocks;
    a source of 64B/66B idle blocks;
    a multiplexer having data inputs coupled to the FIFO buffer, the source of 64B/66B path overhead blocks, the source of 64B/66B pad blocks, and the source of 64B/66B idle blocks, the multiplexer having control inputs and a data output; and
    a multiplexer controller having multiplexer control outputs coupled to the control inputs of the multiplexer, the multiplexer controller responsive to the GMP window frame pulses and to a count of data blocks to be sent in a next path signal frame from a previous GMP window frame to selectively pass data from one of the FIFO buffer, the source of 64B/66B path overhead blocks, the source of 64B/66B pad blocks and the source of 64B/66B idle blocks to the data output so as to fill a GMP window frame.

2. The source node of claim 1 wherein the GMP window frame includes a total number of data blocks equal to the count of data blocks to be sent in a next path signal frame from the previous GMP window frame.

3. The source node of claim 1 wherein the GMP window frame comprises the plurality of path overhead 64B/66B data blocks, a plurality of encoded client data signal 64B/66B blocks from the 64B/66B encoded client data stream, a plurality of the 64B/66B pad blocks and the control 64B/66B block, the control 64B/66B block occupying a last position in the GMP signal frame.

4. The source node of claim 1 wherein the multiplexer controller is configured to vary a number of the 64b/66B pad blocks passed to the output of the multiplexer so as to fill the GMP window frame.

5. The source node of claim 1 wherein the multiplexer controller is configured to pass a fixed number of 64b/66B pad blocks to the output of the multiplexer to fill the GMP window frame.

6. A source node for rate adapting a constant bit rate client signal into a signal stream in a 64B/66B-block telecom signal communication link, the source node comprising:
   a ITU-T Generic Mapping Procedure (GMP) engine including a free-running source of GMP window frame pulses;
   a FIFO buffer coupled to receive a 64B/66B encoded client data stream;
   a clock rate measuring circuit coupled to measure a clock rate of the 64B/66B encoded client data stream and provide the clock rate to the GMP engine;
   a source of 64B/66B path overhead blocks, the path overhead 64B/66B blocks including a control 64B/66B block encoded into an ordered set block-designator and a plurality of path overhead 64B/66B data blocks, a count of data blocks to be sent in a next path signal frame encoded into the plurality of path overhead 64B/66B data blocks;
   a source of 64B/66B pad blocks;
   a source of 64B/66B idle blocks;
   a multiplexer having data inputs coupled to the FIFO buffer, the source of 64B/66B path overhead blocks, the source of 64B/66B pad blocks, and the source of 64B/66B idle blocks, the multiplexer having control inputs and a data output; and
   a multiplexer controller having multiplexer control outputs coupled to the control inputs of the multiplexer, the multiplexer controller responsive to the GMP window frame pulses and to a count of data blocks to be sent in a next path signal frame from a previous GMP window frame to selectively pass data from one of the FIFO buffer, the source of 64B/66B path overhead blocks, the source of 64B/66B pad blocks and the source of 64B/66B idle blocks to the data output to fill a GMP window frame.

7. The source node of claim 6 wherein the GMP window frame includes a total number of data blocks equal to the count of data blocks to be sent in a next path signal frame from the previous GMP window frame.

8. The source node of claim 7 wherein the GMP window frame comprises the plurality of path overhead 64B/66B data blocks, a plurality of encoded client data signal 64B/66B blocks from the 64B/66B encoded client data stream, a plurality of the 64B/66B pad blocks and the control 64B/66B block, the control 64B/66B block occupying a last position in the GMP signal frame.

9. The source node of claim 6 wherein the multiplexer controller is configured to vary a number of the 64b/66B pad blocks passed to the output of the multiplexer so as to fill the GMP window frame.

10. The source node of claim 6 wherein the multiplexer controller is configured to pass a fixed number of 64b/66B pad blocks to the output of the multiplexer to fill the GMP window frame.

11. A system comprising:
   a source node for rate adapting a constant bit rate client signal into a signal stream in a 64B/66B-block telecom signal communication link, the source node including:
      a ITU-T Generic Mapping Procedure (GMP) engine including a free-running source of GMP window frame pulses or synchronized to an external source of GMP window frame pulses;
      a first FIFO buffer coupled to receive a 64B/66B encoded client data stream;
      a clock rate measuring circuit coupled to measure a clock rate of the 64B/66B encoded client data stream and provide the clock rate to the GMP engine;
      a source of 64B/66B path overhead blocks, the path overhead 64B/66B blocks including a control 64B/66B block encoded into an ordered set block-designator and a plurality of path overhead 64B/66B data blocks, a count of data blocks to be sent in a next path signal frame encoded into the plurality of path overhead 64B/66B data blocks;
      a source of 64B/66B pad blocks;
      a source of 64B/66B idle blocks;
      a multiplexer having data inputs coupled to the first FIFO buffer, the source of 64B/66B path overhead blocks, the source of 64B/66B pad blocks, and the source of 64B/66B idle blocks, the multiplexer having control inputs and a data output; and
      a multiplexer controller having multiplexer control outputs coupled to the control inputs of the multiplexer, the multiplexer controller responsive to GMP window frame pulses and to a frame count of data blocks to be sent in a next path signal frame from a previous GMP window frame to selectively pass data from one of the first FIFO buffer, the source of 64B/66B path overhead blocks, the source of 64B/66B pad blocks, and the source of 64B/66B idle blocks to the data output so as to fill a GMP window frame;
   a sink node including:
      a DSP engine;
      a clock rate measuring circuit measuring clock rate data from the 64B/66B client signal stream and coupled to the DSP engine;
      a GMP overhead and count idle extraction circuit coupled to read the GMP window frame and to extract GMP overhead blocks and count 64B/66B idle blocks from the encoded 64B/66B client signal stream;
      a client payload extracting circuit coupled to read data from the GMP window frame and to extract the constant bit rate client signal from the GMP window frame; and
      a second FIFO buffer coupled to the client payload extracting circuit to receive the extracted constant bit rate client signal extracted from the GMP window frame and to output the constant bit rate client signal extracted from the GMP window frame.

12. The source node of claim 11 wherein the GMP window frame includes a total number of data blocks equal to the count of data blocks to be sent in a next path signal frame from the previous GMP window frame.

13. The source node of claim 12 wherein the GMP window frame comprises the plurality of path overhead 64B/66B data blocks, a plurality of encoded client data signal 64B/66B blocks from the 64B/66B encoded client data stream, a plurality of the 64B/66B pad blocks, and the control 64B/66B block, the control 64B/66B block occupying a last position in the GMP signal frame.

* * * * *